United States Patent
Jiang et al.

(10) Patent No.: US 9,222,432 B2
(45) Date of Patent: Dec. 29, 2015

(54) PATH PLANNING DURING COMBUSTION MODE SWITCH

(71) Applicant: Robert Bosch GmbH, Stuttgart (DE)

(72) Inventors: Li Jiang, Ann Arbor, MI (US); Nikhil Ravi, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 461 days.

(21) Appl. No.: 13/681,499

(22) Filed: Nov. 20, 2012

(65) Prior Publication Data

US 2013/0131957 A1    May 23, 2013

Related U.S. Application Data

(60) Provisional application No. 61/562,820, filed on Nov. 22, 2011.

(51) Int. Cl.
| | |
|---|---|
| *F02D 37/02* | (2006.01) |
| *F02D 13/02* | (2006.01) |
| *F02D 41/30* | (2006.01) |
| *F02D 41/14* | (2006.01) |

(52) U.S. Cl.
CPC ............ *F02D 41/3076* (2013.01); *F02D 13/02* (2013.01); *F02D 37/02* (2013.01); *F02D 41/307* (2013.01); *F02D 41/3035* (2013.01); *F02D 41/3041* (2013.01); *F02D 2041/1412* (2013.01); *F02D 2200/701* (2013.01); *F02D 2250/21* (2013.01); *Y02T 10/128* (2013.01)

(58) Field of Classification Search
CPC ..... F02D 37/02; F02D 13/02; F02D 41/3076; F02D 2200/701; F02D 2250/21
USPC .......... 701/102, 103, 104, 105, 110; 123/435, 123/436, 299, 300, 304, 295, 305
See application file for complete search history.

(56) References Cited

U.S. PATENT DOCUMENTS

| | | | |
|---|---|---|---|
| 6,725,825 | B1 | 4/2004 | Kurtz et al. |
| 6,742,494 | B2 | 6/2004 | Unger et al. |
| 6,923,167 | B2 | 8/2005 | Flowers |

(Continued)

OTHER PUBLICATIONS

Yang et al., "SI and HCCI Combustion Mode Transition Control of an HCCI Capable SI Engine," Control Systems Technology, IEEE Transactions on , vol. PP, No. 99, p. 1.

(Continued)

*Primary Examiner* — Mahmoud Gimie
(74) *Attorney, Agent, or Firm* — Michael Best & Friedrich LLP

(57) ABSTRACT

Systems and methods are provided for transitioning between a first combustion mode and a second combustion mode in an internal combustion engine. A current operating point of the engine is identified and a target operating point for the internal combustion engine in the second combustion mode is also determined. A predefined optimized transition operating point is selected from memory. While operating in the first combustion mode, one or more engine actuator settings are adjusted to cause the operating point of the internal combustion engine to approach the selected optimized transition operating point. When the engine is operating at the selected optimized transition operating point, the combustion mode is switched from the first combustion mode to the second combustion mode. While operating in the second combustion mode, one or more engine actuator settings are adjusted to cause the operating point of the internal combustion to approach the target operating point.

15 Claims, 4 Drawing Sheets

(56) References Cited

U.S. PATENT DOCUMENTS

| | | | |
|---|---|---|---|
| 6,947,830 B1 | 9/2005 | Froloff et al. | |
| 7,274,986 B1 * | 9/2007 | Petridis et al. | 701/102 |
| 7,275,514 B2 | 10/2007 | Kuo et al. | |
| 7,357,103 B2 | 4/2008 | Koopmans | |
| 7,363,911 B2 | 4/2008 | Brehob | |
| 7,370,616 B2 | 5/2008 | Kuo et al. | |
| 7,412,322 B1 * | 8/2008 | Rask et al. | 701/104 |
| 7,431,011 B2 | 10/2008 | Wagner et al. | |
| 7,481,185 B1 | 1/2009 | Park et al. | |
| 7,503,166 B2 | 3/2009 | Jankovic | |
| 7,503,167 B2 | 3/2009 | Jankovic | |
| 7,717,084 B2 * | 5/2010 | Kurotani et al. | 123/295 |
| 7,730,870 B2 | 6/2010 | Michelini et al. | |
| 7,769,525 B2 * | 8/2010 | Kakuya et al. | 701/103 |
| 7,866,148 B2 * | 1/2011 | O'Neill | 60/324 |
| 7,918,205 B2 * | 4/2011 | Wermuth et al. | 123/295 |
| 7,963,268 B2 | 6/2011 | Kang et al. | |
| 7,966,991 B2 | 6/2011 | Kang et al. | |
| 7,992,541 B2 | 8/2011 | Petridis et al. | |
| 8,055,432 B2 | 11/2011 | Sun et al. | |
| 2005/0183693 A1 | 8/2005 | Yang et al. | |
| 2009/0229563 A1 | 9/2009 | Rayl et al. | |
| 2010/0274465 A1 | 10/2010 | Ramappan et al. | |
| 2011/0047967 A1 | 3/2011 | Bauer et al. | |

OTHER PUBLICATIONS

Koopmans et al., "Demonstrating a SI-HCCI-SI mode change on a Volvo 5-cylinder electronic valve control engine," In SAE World Congress, Detroit, MI, USA, 2003. SAE 2003-01-0753.

Milovanovic et al., "SI-HCCI-SI Mode Transition at Different Engine Operating Conditions," SAE International, SAE Technical Paper 2005-01-0156, 2005.

Matsuda et al., "A Study of a Gasoline-fueled HCCI Engine•Mode Changes from SI Combustion to HCCI Combustion•," SAE International, SAE Technical Paper 2008-01-0050, 2008.

Cairns et al., "The Effects of Two-Stage Cam Profile Switching and External EGR on SI-CAI Combustion Transitions," SAE International, SAE Technical Paper 2007-01-0187, 2007.

Tian et al., "Mode Switch of SI-HCCI Combustion on a GDI Engine," SAE International, SAE Technical Paper 2007-01-0195, 2007.

Kakuya et al., "Investigation of a SI-HCCI Combustion Switching Control Method in a Multi-Cylinder Gasoline Engine," SAE International, SAE Technical Paper 2008-01-0792, 2008.

* cited by examiner

PATH PLANNING DURING COMBUSTION MODE SWITCH

RELATED APPLICATIONS

This application claims priority to U.S. Provisional Application No. 61/562,820, filed Nov. 22, 2011, titled "METHOD FOR PATH PLANNING DURING COMBUSTION MODE SWITCH," the entirety of which is incorporated herein by reference.

STATEMENT REGARDING FEDERALLY SPONSORED RESEARCH OR DEVELOPMENT

This invention was made with Government support under grant No. DE-EE0003533 award by the Department of Energy. The Government has certain rights in this invention.

BACKGROUND

The present invention relates to optimizing the performance of an internal combustion engine during a transition between two different combustion modes—for example, a transition between spark ignition (SI) and homogeneous charge compression ignition (HCCI).

In HCCI combustion, an electric discharge (e.g., a spark) is not used to ignite the fuel and air mixture. Instead, well-mixed fuel and air are compressed until ignition occurs simultaneously through the gas/air mixture in an engine cylinder. As a result, fuel savings of up to thirty percent (30%) can be achieved. However, problems arise with using HCCI combustion at increased power levels. As a results, engines have been designed which use HCCI combustion at lower power levels and switch to SI combustion at high power levels.

SUMMARY

The transition between different combustion modes can often affect the performance and reliability of the vehicle engine. As such, systems and methods described below optimize the combustion mode switch based on different engine system dynamics and control actuator authorities at different operating parameters of the internal combustion engine. In particular, by transitioning between combustion modes only at previously identified transition points that have been optimized for a particular engine system, the performance of the engine during a combustion mode switch is improved.

In one embodiment, the invention provides a method of transitioning between a first combustion mode and a second combustion mode in an internal combustion engine. A current operating point is identified including a current value of a first operating parameter, such as an engine speed, and a current value of a second operating parameter. A target operating point for the internal combustion engine in the second combustion mode is also determined. A memory is accessed storing a plurality of optimized transition operating points and an optimized transition operating point is selected. While operating in the first combustion mode, one or more engine actuator settings are adjusted to cause the operating point of the internal combustion engine to approach the selected optimized transition operating point. When the engine is operating at the selected optimized transition operating point, the combustion mode is switched from the first combustion mode to the second combustion mode. While operating in the second combustion mode, one or more engine actuator settings are adjusted to cause the operating point of the internal combustion to approach the target operating point.

In another embodiment, the invention provides an engine control unit including a processor and a memory. The memory stores instructions that are executed by the processor to cause the engine control unit to control the operation of an internal combustion engine as it transitions from a first combustion mode to a second combustion mode. A current operating point is identified including a current value of a first operating parameter, such as an engine speed, and a current value of a second operating parameter. A target operating point for the internal combustion engine in the second combustion mode is also determined. A memory is accessed storing a plurality of optimized transition operating points and an optimized transition operating point is selected. While operating in the first combustion mode, one or more engine actuator settings are adjusted to cause the operating point of the internal combustion engine to approach the selected optimized transition operating point. When the engine is operating at the selected optimized transition operating point, the combustion mode is switched from the first combustion mode to the second combustion mode. While operating in the second combustion mode, one or more engine actuator settings are adjusted to cause the operating point of the internal combustion to approach the target operating point.

In another embodiment, the invention provides a method of transitioning between a spark ignition mode and a homogeneous charge compression ignition mode in an internal combustion engine. A current operating point is identified for the engine operating in the spark ignition mode. The current operating point includes a current value of engine speed and a current value of a cylinder pressure. A target operating point is identified for the engine in the homogeneous charge compression ignition mode. Using a system model, a path of operating points from the current operating point to the target operating point is predicted. A first optimized transition operating point is selected from a plurality of optimized transition operating points stored on a memory. Each optimized transition operating point is an operating point where the engine is able to achieve a torque neutral transition between spark ignition and homogeneous charge compression ignition. The first optimized transition operating point is the optimized transition operating point that is closest to one of the operating points on the predicted path of operating points. While operating in spark ignition mode, one or more engine actuator settings are adjusted to cause the operating point of the internal combustion engine to approach the first optimized transition operating point. When the engine is operating at the selected optimized transition operating point, the combustion mode is switched from spark ignition combustion to homogeneous charge compression ignition combustion. Then, while operating in the homogeneous charge compression ignition mode, one or more engine actuator settings are adjusted to cause the operating point of the internal combustion to approach the target operating point.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
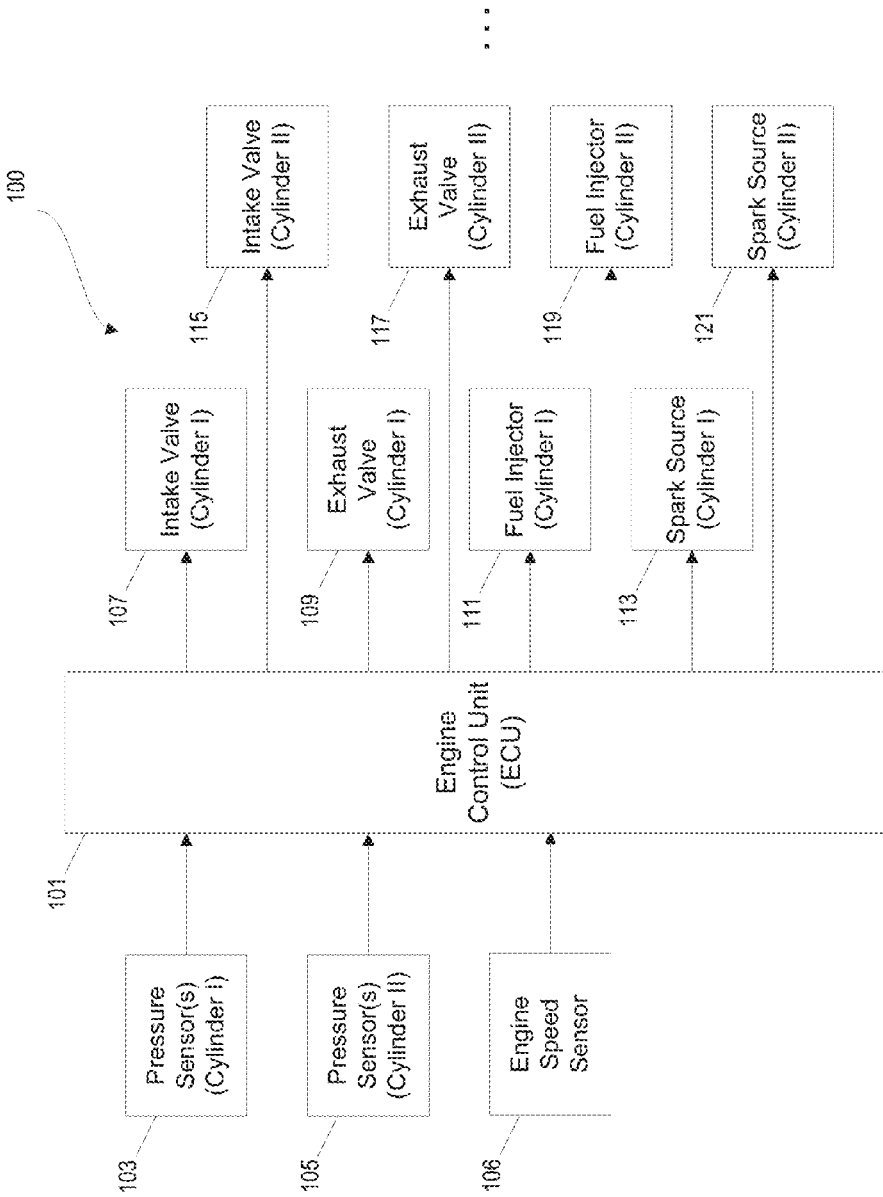
FIG. 1 is a block diagram of an engine control unit (ECU) operating in a vehicle system according to one embodiment.

FIG. 1 illustrates a system 100 for controlling the operation of an internal combustion engine. As described in further detail below, the system 100 is capable of operating the engine in various combustion modes including, for example, spark ignition (SI), homogeneous charge compression ignition (HCCI), and spark-assisted compression ignition (SACI). The system includes an engine control unit 101 that includes a processor and a memory. The memory stores instructions that are executed by the processor to cause the engine control unit 101 to perform various functional operations. The engine control unit 101 receives inputs from various sensors including one or more pressure sensors 103, 105 associated with each cylinder of the internal combustion engine and an engine speed sensor 106. Alternatively, the system 100 can include other sensors that provide information regarding the status of the engine to the engine control unit 101 such as, for example, temperature sensors for the engine as a whole and temperature sensors associated with each individual cylinder. Furthermore, in some embodiments, engine operating parameters such as engine speed and cylinder pressure can be estimated or determined based on other information including actuator settings controller by the engine control unit 101.

Based on the combustion mode being implemented and, in some cases, the inputs received from the various engine sensors, the engine control unit 101 controls the operation of the engine by providing control signals (or actuator settings) to a plurality of actuators. For example, as illustrated in FIG. 1, the engine control unit 101 can control the intake valve 107, an exhaust valve 109, a fuel injector 111, and a spark source 113 in a specific engine cylinder. The engine control unit 101 can also control the operation of an intake valve 115, exhaust valve 117, fuel injector 119, and spark source 121 for other cylinders in the engine.

Based on user inputs such as the position of an accelerator pedal, the engine control unit 101 will adjust the actuator settings to achieve optimal engine performance. Examples of how an engine control unit 101 can be used to optimize the performance of an engine are described in U.S. Publication No. 2012/0253636, which is incorporated herein by reference. However, the engine actuator settings required to achieve optimal engine performance may change depending upon the current combustion mode being used by the engine.

Figure 2:
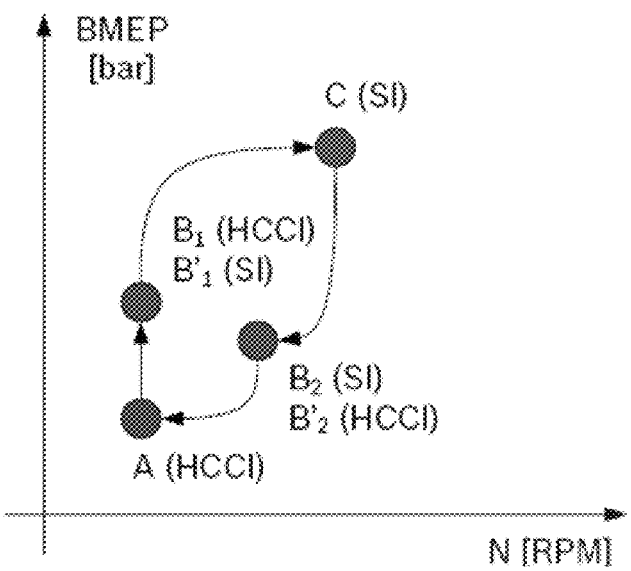
FIG. 2 is a chart showing an example of an optimized path for combustion mode switching between HCCI combustion and SI combustion.

FIG. 2 illustrates an example of an optimized operating point path for a transition between a SI combustion mode and a HCCI combustion mode. In this example, the engine begins by operating at operating point A in the HCCI combustion mode. Operating point A includes a defined engine speed (N) and a defined cylinder pressure (BMEP). However, the optimal operating point for the engine when operating in spark ignition is operating point C. To ensure a smooth transition from HCCI combustion to SI combustion, the engine control unit performs the combustion mode switch at operating point $B_1$. Operating point $B_1$ is an operating point at which the engine can transition to SI combustion without affecting the torque provided by the engine (e.g., a torque-neutral transition). Similarly, when transitioning from SI combustion to HCCI combustion, the engine control unit 101 ensures that the engine operating parameters approach operating point $B_2$. Although in some situations it is possible that points $B_1$ and $B_2$ are the same, in other situations points $B_1$ and $B_2$ would differ based on differences in the dynamics of transitioning from SI to HCCI vs. HCCI to SI.

Figure 3:
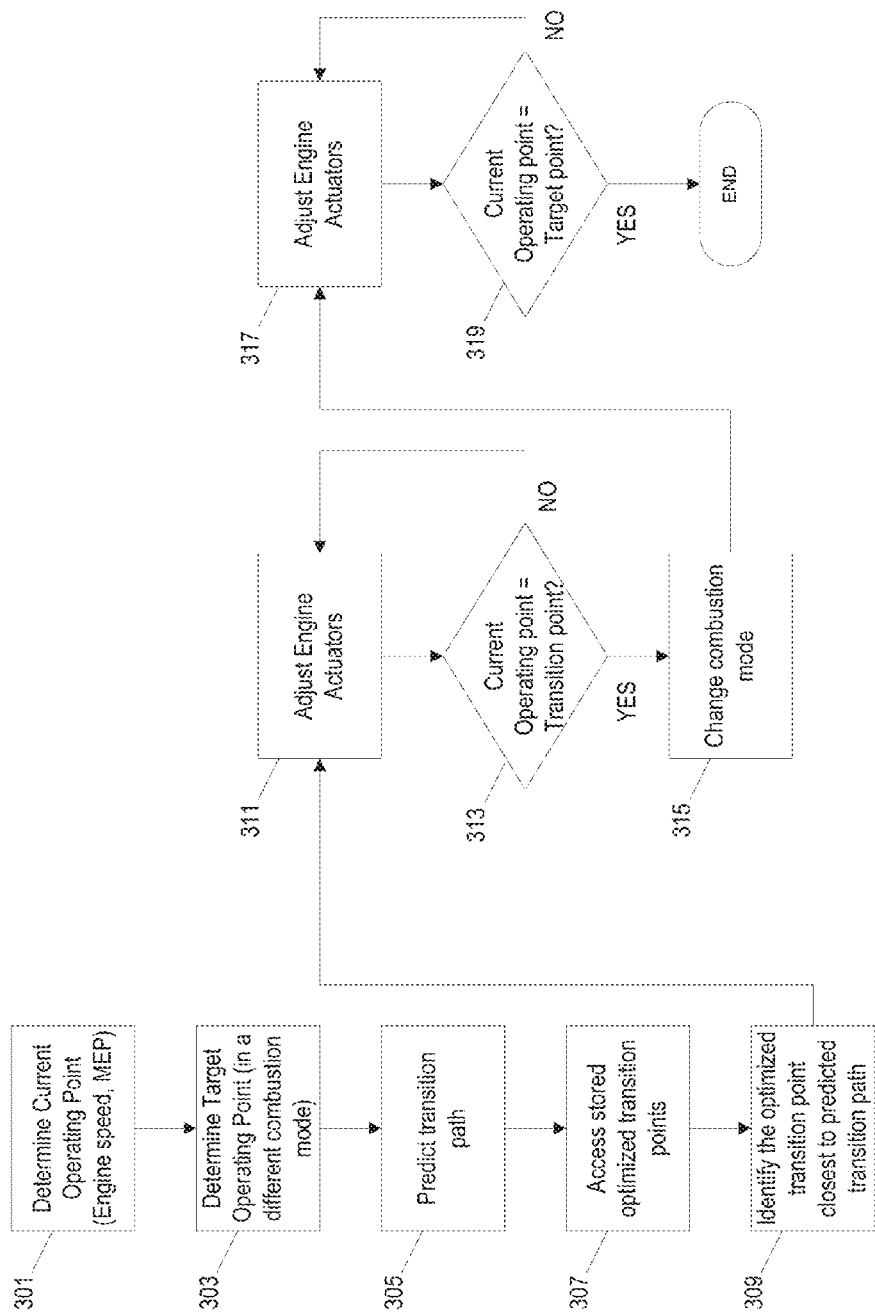
FIG. 3 is a flowchart of a method of implementing the combustion mode switch of FIG. 2 using the ECU of FIG. 1.

FIG. 3 illustrates a method implemented by the engine control unit 101 for affecting a combustion mode transition path such as illustrated in FIG. 2. The engine control unit 101 identifies the current engine speed and cylinder pressure (i.e., the current operating point, Operating Point A in FIG. 2) of the engine in HCCI combustion mode (step 301). The system then determines a target operating point for the engine after the transition to SI combustion (i.e., the target operating point, Operating Point C in FIG. 2) (step 303). The engine control unit then implements a predictive algorithm to predict a transition path from the current operating point to the target operating point in the other combustion mode (step 305). U.S. patent application Ser. No. 13/621,433 (filed Sep. 17, 2012), the entire contents of which are incorporated herein by references, describes an example of a model-based method for predicting changes in engine operating parameters in subsequent combustion cycles due to changes in engine actuator settings. However, in some embodiments, the transition path can be predicted using other techniques.

Once the transition path between the current operating point (in HCCI) and the target operating point (in SI) is predicted, the engine control unit 101 accesses a plurality of optimized transition operating points stored in the memory of the engine control unit 101 (step 307). The optimized transition operating points can be stored in the form of a look-up table or other data structure. The optimized transition operating points are calibrated for the specific vehicle/engine system and define operating points where the combustion mode of the engine can be switched without causing a substantial adverse effect on the performance of the engine. The optimized transition operating points can be stored to the memory by the manufacturer or, in some embodiments, can be calibrated by a technician during a vehicle tuning to account for any post-manufacture changes or adjustments to the engine system.

Figure 4:
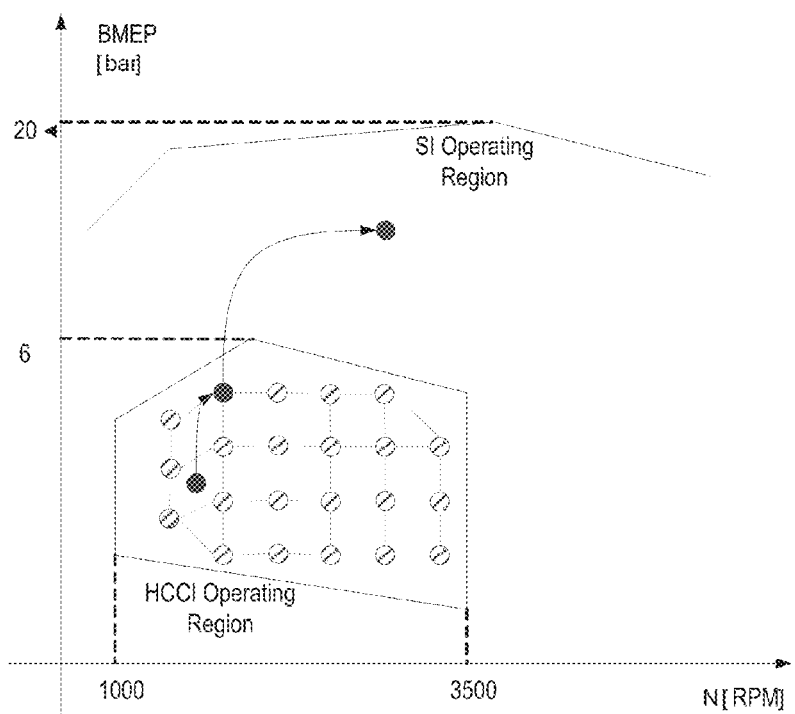
FIG. 4 is a chart showing a plurality of previously defined optimized transition points for a particular vehicle system to be used by the ECU of FIG. 1 during the method of FIG. 3.

FIG. 4 provides an illustrated example of these previously defined optimized transition points in relation to the HCCI and SI operating regions. As discussed above, HCCI combustion can be less effective at high power levels. As such, HCCI combustion is only implemented under more limited operating parameters (or operating points). The HCCI operating region in FIG. 4 is defined by the shaded area on the chart. However, SI combustion can be implemented at a much wider range of operating points—including, in most cases, all of the operating points where HCCI combustion is preferably applied.

Based upon the anticipated transition from operating point A in HCCI combustion to operating point B is SI combustion, the engine control unit 101 selects the optimized transition operating point from the plurality of previously stored optimized transition operating points that falls closest to the predicted transition path (step 309). Although FIG. 3 describes the engine control unit 101 predicting the transition path before selecting an optimized transition operating point, in some embodiments, the path prediction and transition point selection steps are performed in parallel. For example, in some systems, certain of the optimized transition operating points simply cannot be achieved be adjusting one or more engine actuator settings in the current combustion mode. In such cases, the optimized transition operating point is selected based on changes in engine operating parameters that can practically be achieved by the engine control unit 101. In other systems, the optimized transition operating point is selected that best satisfies predetermined performance criteria such as, for example, a minimum number of cycles for a complete combustion mode transition and minimum torque difference at the switching point.

After an optimized transition operating point ($B_1$) is identified, the engine control unit 101 adjusts one or more engine actuator settings while continuing to operate in the HCCI combustion mode and causes the operating point of the engine to approach the optimized transition operating point ($B_1$) (step 311). When the current operating point of the engine reaches the transition operating point (step 313), the engine control unit 101 changes the combustion mode from HCCI combustion to SI combustion (step 315). The engine control unit 101 then continues to adjust the engine actuators (step 317) until the operating point of the engine reaches the target operating point (C) while operating in SI combustion.

The process illustrated in FIG. 3 is also used for the transition from an operating point (C) in spark ignition to an operating point (A) in HCCI combustion. However, due to limitations of the engine control unit's ability to control the engine operating parameters by adjusting the engine actuator settings, the optimal transition operating point ($B_2$) for the transition from SI to HCCI may be different from the optimal transition operating point ($B_1$) for the transition from HCCI to SI.

Figure 5:
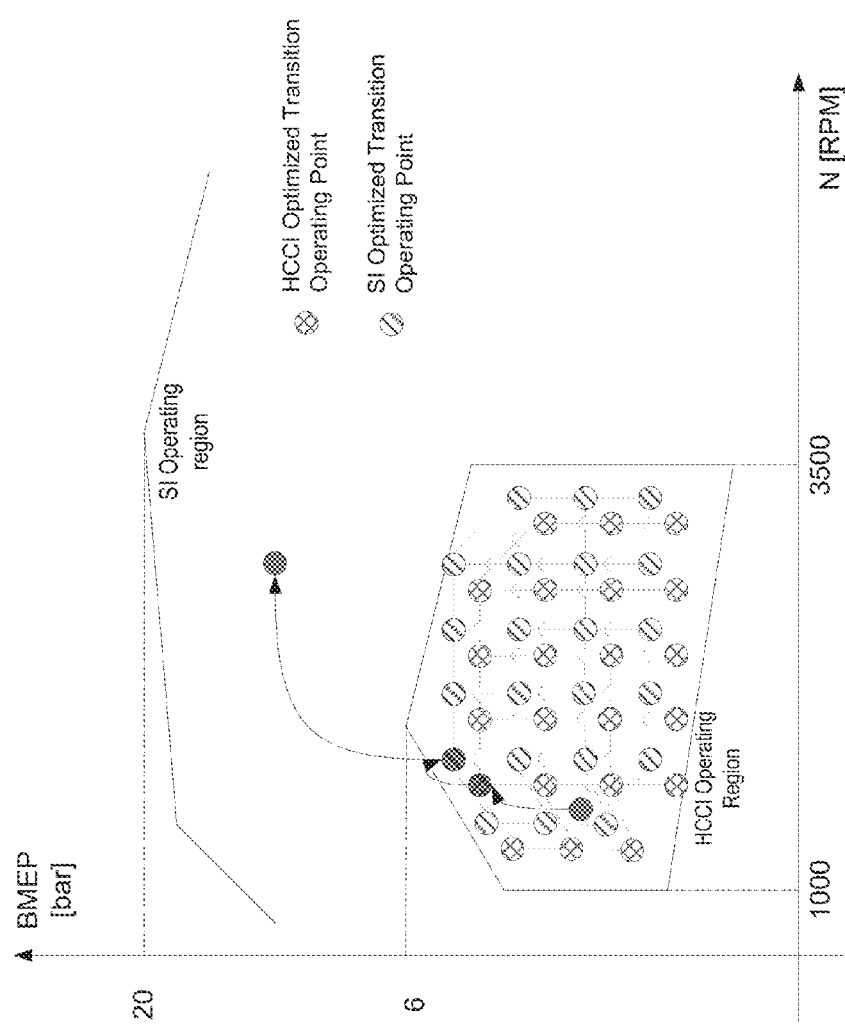
FIG. 5 is a chart showing two sets of optimized transition points for a particular vehicle system to be used by the ECU of FIG. 1 during the method of FIG. 3.

As discussed above, the engine actuator settings required to achieve a set of operating parameters (e.g., an operating point) in SI combustion will often differ from the actuator settings required to achieve the same operating parameters in HCCI combustion. This is illustrated in FIG. 2 by differentiating between operating $B_1$ (which is an operating point achieved when operating the engine in HCCI combustion) and $B'_1$ (which is an operating point achieved when operating the engine in SI combustion). In the illustrated example $B_1$ and $B'_1$ are equal. However, as illustrated in FIG. 5, in some constructions of this system, the engine speed or mean effective pressure when operating in HCCI combustion at the transition operating point may be slightly different from the engine operating parameters immediately after the transition to SI combustion. As such, the optimized transition operating point in one combustion mode (e.g., the HCCI optimized transition operating point) may correspond to a slightly different optimized transition operating point in another combustion mode (e.g., the SI optimized transition operating point).

Also, in some constructions, the set of optimized transition operating points may be defined for specific combustion mode transitions. For example, a specific set of optimized transition operating points is stored for transitions between SI combustion and HCCI combustion while a separate set of optimized transition operating points is stored for transitions between HCCI combustion and SI combustion.

Furthermore, the control authorities of the engine actuators will often be different in the different combustion modes and in different vehicle/engine systems. In other words, when operating in the SI combustion mode, the system may adjust one engine actuator (e.g., the amount of fuel injected) to change the operating point of the engine. However, after the transition to HCCI combustion, the system would adjust one or more different engine actuator settings (e.g., the valve timings) to change the operating point of the engine. As such, in some constructions, the engine actuators associated with changing the operating point of the engine and the magnitude of changes to the engine actuator settings are calibrated for a specific vehicle/engine system.

Key actuators in the air path can include a turbocharger wastegate, a supercharger clutch and bypass valve, a throttle, an external exhaust gas recirculation (EGR) valve, and an advanced valve-train. In order to enable the combustion mode switch, the engine system may include an advanced valve-train that includes cam profile switching and electric cam phasing or a fully flexible valve-train. Various other engine actuator settings that can be used to adjust the operating point of the vehicle include, for example, fuel injection timing, fuel injection quantity, valve timing, spark timing, and injection strategy (e.g., the number and timing of fuel injections during a single combustion cycle).

Furthermore, although the examples described above only discuss transitions between SI combustion and HCCI combustion, the path planning methods and systems can be implemented in systems that use different or additional combustion modes. For example, some vehicle systems use a spark-assisted compression ignition (SACI) combustion mode as a transition between SI combustion and HCCI combustion. The path planning methods described above can be used to identify and utilize optimized transition operating points between SI and SACI combustion and between SACI and HCCI combustion. Some systems that operate in more than two combustion modes will store a different set of optimized transition operating points for each combustion mode transition. For example, a first set of optimized transition operating points is stored for transitions between SI combustion and SACI combustion while a second set of optimized transition operating points is stored for transitions between SACI combustion and HCCI combustion.

Finally, in the examples provided above, the optimized transition operating points are operating points at which a torque-neutral transition between the two combustion modes can be achieved. However, in other embodiments, the optimized transition operating points can be defined to ensure other desired operating parameters during the combustion mode transition. For example, in some constructions, the optimized transition operating points define points are which the combustion mode can be switched without affecting the combustion phasing of the engine.

Thus, the invention provides, among other things, a systems and methods for providing optimized transitions between combustion modes by identifying and implementing an optimized transition operating point from a plurality of predefined optimized transition operating points that have been calibrated for a specific vehicle or engine system. Various features and advantages of the invention are set forth in the following claims.

What is claimed is:

1. A method of transitioning between a first combustion mode and a second combustion mode in an internal combustion engine, the method comprising:
   identifying a current operating point for the internal combustion engine operating in the first combustion mode, the current operating point including a current value of a first operating parameter of the internal combustion engine and a current value of a second operating parameter of the internal combustion engine;
   determining a target operating point for the internal combustion engine to be operating in the second combustion mode, the target operating point including a target value of the first operating parameter and a target value of the second operating parameter;

predicting a path of operating points for the internal combustion engine as the operating point of the engine moves from the current operating point to the target operating point;

accessing from a memory a plurality of optimized transition operating points, each optimized transition operating point including a target transition value of the first operating parameter and a target transition value of the second operating parameter;

selecting an optimized transition operating point from the plurality of optimized transition operating points that is closest to the predicted path of operating points;

adjusting one or more engine actuator settings while operating in the first combustion mode to cause the first operating parameter to approach the target transition value of the first operating parameter for the selected optimized transition operating point and to cause the second operating parameter to approach the target transition value of the second operating parameter for the selected optimized transition operating point;

changing from the first combustion mode to the second combustion mode when the first operating parameter is substantially equal to the target transition value of the first operating parameter for the selected optimized transition operating point and the second operating parameter is substantially equal to the target transition value of the second operating parameter for the selected optimized transition operating point; and adjusting one or more engine actuator setting, after changing from the first combustion mode to the second combustion mode, to cause the first operating parameter to approach the target value of the first operating parameter and to cause the second operating parameter to approach the target value of the second operating parameter.

2. The method of claim 1, wherein the first combustion mode includes a spark ignition mode and the second combustion mode includes a homogeneous charge compression ignition mode.

3. The method of claim 1, wherein the first combustion mode includes a homogeneous charge compression ignition mode and the second combustion mode includes a spark ignition mode.

4. The method of claim 1, wherein at least one of the first combustion mode and the second combustion mode includes a spark-assisted compression ignition mode.

5. The method of claim 1, wherein at least one of the first operating parameter and the second operating parameter includes an engine speed.

6. The method of claim 1, wherein at least one of the first operating parameter and the second operating parameter includes a mean effective pressure of the engine.

7. The method of claim 1, wherein the act of identifying the current operating point for the internal combustion engine includes receiving a value from an engine sensor and determining the current value of the first operating parameter based on the value received from the engine sensor.

8. The method of claim 1, wherein adjusting one or more engine actuator settings includes adjusting an amount of fuel injected into a cylinder and a fuel injection timing of the internal combustion engine during a combustion cycle.

9. The method of claim 1, wherein adjusting the one or more engine actuator settings includes adjusting a spark timing for a cylinder while operating in a spark ignition combustion mode.

10. The method of claim 1, wherein each optimized transition operating point of the plurality of optimized transition operating points is an operating point where the engine is able to achieve a torque neutral transition from the first combustion mode to the second combustion mode.

11. An engine control unit including a processor and a memory storing instructions that, when executed by the processor, cause the engine control unit to:

identify a current operating point for an internal combustion engine operating in a first combustion mode, the current operating point including a current value of a first operating parameter of the internal combustion engine and a current value of a second operating parameter of the internal combustion engine;

determine a target operating point for the internal combustion engine to be operating in an second combustion mode, the target operating point including a target value of the first operating parameter and a target value of the second operating parameter;

access from the memory a plurality of optimized transition operating points, each optimized transition operating point including a target transition value of the first operating parameter and a target transition value of the second operating parameter, and wherein each optimized transition operating point of the plurality of optimized transition operating points is an operating point where the engine is able to achieve a torque neutral transition from the first combustion mode to the second combustion mode;

select an optimized transition operating point from the plurality of optimized transition operating points;

adjust one or more engine actuator settings, prior to changing from the first combustion mode to the second combustion mode, to cause the first operating parameter to approach the target transition value of the first operating parameter for the selected optimized transition operating point and to cause the second operating parameter to approach the target transition value of the second operating parameter for the selected optimized transition operating point;

change from the first combustion mode to the second combustion mode when the first operating parameter is substantially equal to the target transition value of the first operating parameter for the selected optimized transition operating point and the second operating parameter is substantially equal to the target transition value of the second operating parameter for the selected optimized transition operating point; and adjust the one or more engine actuator setting, after changing from the first combustion mode to the second combustion mode, to cause the first operating parameter to approach the target value of the first operating parameter and to cause the second operating parameter to approach the target value of the second operating parameter.

12. The engine control unit of claim 11, wherein the instructions, when executed by the processor, further cause the engine control unit to predict a path of operating points for the internal combustion engine as the operating point of the engine moves from the current operating point to the target operating point, and cause the engine control unit to select an optimized transition operating point from the plurality of optimized transition operating points by selecting the optimized transition operating point that is closest to the predicted path of operating points.

13. A method of transitioning between a spark ignition mode and a homogeneous charge compression ignition mode in an internal combustion engine, the method comprising:
- identifying a current operating point for the internal combustion engine operating in the spark ignition mode, the current operating point including a current value of engine speed and a current value of a cylinder pressure;
- determining a target operating point for the internal combustion engine in the homogeneous charge compression ignition mode;
- predicting a path of operating points from the current operating point to the target operating point based on a system model for the internal combustion engine;
- selecting a first optimized transition operating point from a plurality of optimized transition operating points stored on a memory, wherein each optimized transition operating point is an operating point where the engine is able to achieve a torque neutral transition between spark ignition and homogeneous charge compression ignition and wherein the first optimized transition operating point is the optimized transition operating point that is closest to one of the operating points on the predicted path of operating points;
- adjusting one or more engine actuator settings while operating in the spark ignition mode to cause the operating point of the internal combustion engine to approach the first optimized transition operating point;
- changing from spark ignition to homogeneous charge compression ignition when the operating point of the internal combustion engine is substantially equal to the first optimized transition operating point; and
- adjusting one or more engine actuator settings while operating in the homogeneous charge compression ignition mode to cause the operating point of the internal combustion engine to approach the target operating point.

14. The method of claim 13, further comprising:
- identifying a second current operating point while operating in the homogeneous charge compression ignition mode;
- determining a second target operating point for the internal combustion engine in the spark ignition mode;
- predicting a second path of operating points from the second current operating point to the second target operating point based on a system model for the internal combustion engine;
- selecting a second optimized transition operating point from the plurality of optimized transition operation points stored on the memory, wherein the second optimized transition operating point it the optimized transition operating point that is closest to one of the operating points on the second predicted path of operating points;
- adjusting one or more engine actuator settings while operating in the homogeneous charge compression ignition mode to cause the operating point of the internal combustion engine to approach the second optimized transition operating point;
- changing from homogeneous charge compression ignition to spark ignition when the operating point of the internal combustion engine is substantially equal to the second optimized transition operating point; and
- adjusting one or more engine actuator settings while operating in the spark ignition mode to cause the operating point of the internal combustion engine to approach the target operating point.

15. The method of claim 14, wherein the current operating point is substantially the same as the second target operating point, the second current operating point is substantially the same as the target operating point, and the first optimized transition operating point is different than the second optimized transition operating point.

* * * * *